Patented June 16, 1931

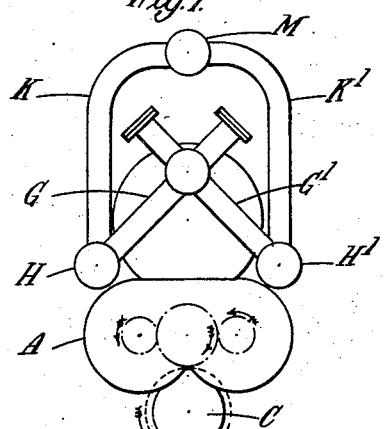
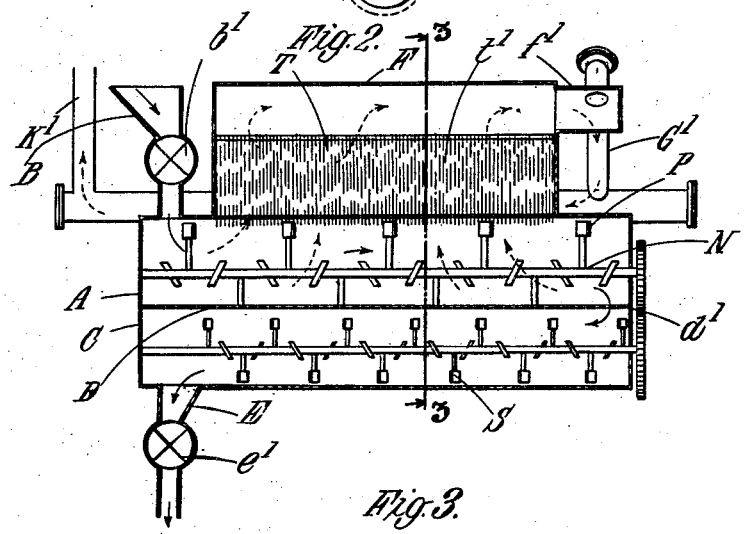
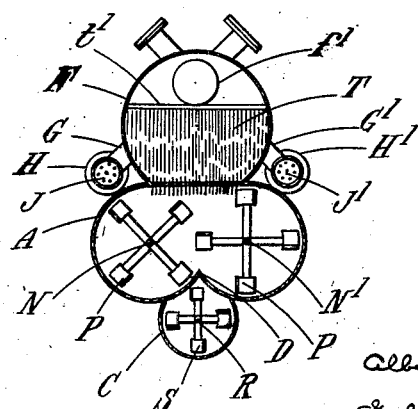

1,810,387

UNITED STATES PATENT OFFICE

ALBERTO EDOARDO BIANCHI, OF MILAN, AND GALILEO GUARDABASSI, OF RHO, NEAR MILAN, ITALY, ASSIGNORS, BY MESNE ASSIGNMENTS, TO "INTERCARBO" SOCIETE ANONYME POUR LA CARBONISATION ET LA TRAITEMENT CATALYTIQUE DES COMBUSTIBLES, OF PARIS, FRANCE

CRACKING, CATALYZING, AND HYDROGENATION OF CARBONACEOUS MATERIALS

Application filed November 30, 1926, Serial No. 151,648, and in Great Britain May 27, 1926.

This invention relates to the cracking, and hydrogenation of fluid, pulverized or ganulated carbonaceous materials, as for example oils, tar, naphtha, ground coal, and the like, at atmospheric pressure.

According to this invention the said operations are performed in a retort or series of troughs which may be cylindrical, semi-cylindrical or of other suitable form, with revolving agitators such for instance as described in the specification of English Patent No. 224,568 dated May 15, 1923, in the presence of catalyzing agents the troughs and agitators being made of iron or other metal or metals, which when heated to a certain degree, say 400° centigrade or more, acts as a catalyzer in promoting the cracking or hydrogenating action on the oil or other hydrocarbon, or on vapours produced in the treatment of the carbonaceous material, or has more than one of these actions concurrently. The materials are continuously passed through the troughs along the bottom of the troughs in a film or layer of relatively small depth, and the heat employed will vary according to the materials treated and the products which it is desired to obtained therefrom. The gases or vapors arising from the said materials are immediately passed through dust or smoke at the same temperature and through a number of chains suspended from a reticulated screen, whereby the reactions are promoted. The agitator itself in revolving takes up a thin film in the case of treatment of fluid or molten material, which is exposed on one side to the dust, or smoke produced by the suspension of finely divided solid particles of the vapours and is on the other side in contact with the metal, whereby cracking or hydrogenation or both together will be promoted.

In order that the said invention may be clearly understood and readily carried into effect, the same will now be described more fully with reference to the accompanying diagrams wherein:—

Figure 1 represents in end elevation an example of apparatus suitable for carrying out this invention.

Figure 2 represents the said apparatus in vertical longitudinal section, and

Figure 3 in cross section, taken on the line 3—3 of Figure 2.

A indicates a large trough into which the material to be treated is fed through a hopper B, the feed being controlled by an automatic rotary valve $b^1$. For charging fluid material, a siphon pipe can be substituted for this feeding device. Under this trough is a smaller trough C in communication with the main trough A through an opening $d'$ in the partition D dividing the said troughs A and C. The trough C is provided with an outlet E also controlled by a rotary valve $e^1$. Above the trough A is a gas chamber F in free communication with the interior of the trough A and having at one end a neck $f'$ communicating with twin pipes G, G' through which the gases pass to longitudinal pipes H, H' provided with filtering screens J, J' (Figure 3) and thence through ascension pipes K, K' to the main offtake pipe M (Figure 1). In the trough A are two rotary shafts N, $N^1$ on which are secured agitators P, the blades of which agitators are set obliquely in relation to the axes of the shafts, and in the trough C is a shaft R rotating at a slower speed and carrying similar agitators S. The shafts N and $N^1$ and the valves $b^1$ and $e^1$ are rotated by any suitable gearing from any convenient source of power, and are timed to rotate at such relative speeds as may be found necessary to enable a sufficient supply of carbonaceous material to be kept up the necessary agitation to be effected, and the semi-coke produced in the apparatus to be removed while maintaining a practically gas-tight separation between the inside of the retort and the atmosphere. In the gas chamber F a large number of small metal chains T are suspended from a reticulated screen $t'$ secured in the chamber, these chains occupying the whole lower part of the chamber F and being of such length that their ends lie in the paths of the agitators P, whereby the said chains are kept in continual vibration. These chains are very small and set very closely together, so that they constitute in effect a thick reticulated surface. They thus prevent dust from passing off with the vapors so that a permanent cloud or fog of very fine dust is formed in the space immediately above a level of the formation of the vapors, in which cloud the vapors are intimately mixed and the catalysis begins. The vapors in passing through the chains are then broken up into very small streams moving in contact with the catalyzing substances coated on the chains. The apparatus is contained in a fire-box, from which only its two ends project. Troughs A and C, which, in fact, constitute the distillation retort proper, are set in a heating chamber within which their outside surface is surrounded with hot combustion gases. Another heating chamber superimposed upon the former encloses the reaction chamber F together with tubes H and H¹. The only portions of the retort projecting out of the setting are the heads of troughs A and C, and the ends of tubes H and H¹. The combustion gases serving for heating the fire boxes are produced in a furnace that is not indicated in the drawings. They may advantageously be led to the two heating chambers through separate ducts, each provided with suitable regulating means, such as butterfly valves, etc., in order that the temperature of the heating gases in each chamber may be varied at will in absolute and in relative values. The material being fed in at B is shaken, triturated and conveyed by the agitators P and S to the outlet E where the residual matter passes out of the apparatus, or if required to another unit of the apparatus for repeated treatment, the gases evolved taking the course indicated by the dotted arrows in Figure 2. The outlet pipes are of alternately constricted and enlarged cross-sectional area, so that the vapors are subjected to successive contractions and expansions, and thus further or concomitant molecular decompositions and combinations are induced or promoted. The shape of the troughs in relation to the agitators is such that a thin film or stratum of the material is constantly maintained on the inner surfaces of the troughs, and for this purpose the partition E forming the roof of the trough C is made to continue the curves of the sides of the trough A until a ridge is formed along the centre of the partition as seen in Figure 3. The chains T may be coated with any substance which will promote the cracking of the vapours formed during the decomposition of the material in the hot troughs A and C, the choice of this substance depending on the materials treated and the results desired, for example, if hydrogenation of vapour arising from the distillation of a fatty substance is desired, the chains are coated with reduced nickel (Sabatier). The screens J, J' have also a catalyzing action, and in passing through the hot pipes H, H' the vapours are subjected to a further catalysis.

It is well-known that metallic surfaces, heated to an appropriate temperature, produce the phenomenon known as cracking, and that coal and coke when heated to an appropriate temperature have the same effect. In the distillation of carbonaceous materials there are formed, on the other hand, gaseous compounds containing a certain proportion of free hydrogen, and vapors which on condensation form tar; and on the other hand, solids such as coke, semicoke, and various other residues, and liquids, non-volatile at the temperature of distillation, which remain at the bottom of the retort. In all cases, and particularly when the material is actively worked during the distillation phase, the mixture of gases and vapors escaping from the mass under treatment (which is preferably passing through the retort in a thin layer) carries with it a cloud of very fine solid particles analogous to soot. In the present apparatus, these particles of solid carbon are utilized to promote cracking and catalyzing of the vapors, so that both cracking and hydrogenation of the vapours are produced without necessarily using a special catalyzer, and without necessarily introducing free hydrogen from an external source. For this purpose, the mixture of gases and vapours, charged with a cloud of dust or smoke, is made to flow through a thick mass or aggregate composed of small independent elements. This aggregate is simultaneously heated and agitated, and completely fills the reaction chamber located above the retort proper. Some of the solid particles of carbon dust settle on these elements, and the rest remain in suspension in the gaseous mixture. Since this gaseous mixture is obliged to flow through the aggregate to escape from the reaction chamber, it becomes very finely subdivided into little streamlets between the independent elements composing the aggregate. This gives an intimate contact between the mixture of gases and vapours and the particles of carbon, both those deposited on the elements and those still borne in suspension by the gaseous currents that whirl through the numerous small channels between the elements.

The advantages of this arrangement include an extensive contact surface, and a rapid and continuous renewed supply of the molecules of gas and vapor in direct contact with this surface. The reaction chamber enclosing the aggregate being externally heated, the contact surfaces can be brought to the exact temperature necessary to produce the desired reactions. Further-more, the entire aggregate is kept in continual agitation, so that the individual elements are in continual relative motion with respect to each other; this motion prevents the formation of large deposits of soot between the elements, which would otherwise tend to bind the elements together, and so eventually to obstruct the passage of the gases into and through the reaction chamber. When the surface deposit of soot becomes too heavy, it breaks loose and drops back into the retort, and is carried off with the residues of the distillation. This does not reduce the efficiency of the device, since the fresh gases and vapours entering the reaction chamber bring a fresh supply of carbon particles to replace those that drop off.

In fact, the conditions are so favorable that not only is the usual phenomenon of cracking obtained—that is, a reduction in the proportion of heavy hydrocarbons and the formation of lighter compounds—but actual hydrogenation also takes place. It is well known that, in the cracking of heavy hydrocarbons, such as lignite primary tars, residues of oil distillation etc., the light condensates obtained contain a certain proportion, and in some cases a relatively large proportion, of unsaturated hydrocarbons, while the gas evolved always contains free hydrogen. Now, in this process, the tar vapors and the gases are intimately mixed, and, while in this condition, are brought in contact with the catalyzing surfaces, as explained above. Under the action of these surfaces, the unsaturated molecules combine with the free hydrogen present in the gas, and become saturated. The result is that, on leaving the reaction chamber, the tar vapours contain practically no olefines, and the gas contains practically no free hydrogen. The cracking and hydrogenation thus take place in the same apparatus without the introduction of hydrogen from an outside source, although if the introduction of additional hydrogen from an outside source were considered desirable, there would be no practical difficulty in effecting such introduction.

What we claim and desire to secure by Letters Patent of the United States is:—

1. In apparatus for cracking and hydrogenating carbonaceous materials, a retort, means for feeding said materials continuously to said retort, agitators adapted to revolve in said retort, a reticulated screen located above said agitators, chains suspended from said screen and adapted to be vibrated by said agitators, means for removing gases from said retort, and means for removing residual matter from said retort.

2. In apparatus for cracking and hydrogenating carbonaceous materials, a retort having curved sides uniting in a longitudinal ridge centrally of the retort bottom, means for feeding said materials continuously to said retort at one end thereof, a second retort located under the said ridge and in communication with the first named retort through an opening in said ridge at the end thereof remote from the feeding end, means for discharging residual matters from the other end of said second retort, agitators adapted to rotate in each of said retorts, a chamber located above said first named retort and opening thereinto, a reticulated screen across said chamber, chains depending from said screen into the upper part of said first named retort and adapted to be vibrated by the agitators therein, and outlet pipes adapted to carry off gases from the top of said chamber.

3. In apparatus for cracking and hydrogenating carbonaceous materials, a retort, means for feeding said materials continuously to said retort, agitators adapted to revolve in said retort, a large number of small chains suspended in said retort above said agitators and adapted to be continuously vibrated by said agitators, means for removing gases from said retort, and means for removing residual matter from said retort.

4. In apparatus for cracking and hydrogenating carbonaceous materials, a retort, means for passing said materials continuously through said retort, a chamber located above said retort and opening thereinto, chains suspended in said chamber and forming a thick foraminous mass having a large contact surface, agitators adapted to revolve in said retort and to keep said chains in continuous vibration, an outlet pipe for gases at the upper part of said chamber, two outlet pipes of less cross-sectional area communicating with said first named outlet pipe, two outlet pipes of greater cross-sectional area each communicating with one of said outlet pipes of lesser area, and two ascension pipes of less cross-sectional area each communicating with one of said outlet pipes of greater cross-sectional area.

ALBERTO EDOARDO BIANCHI.
GALILEO GUARDABASSI.